(12) United States Patent
Wang et al.

(10) Patent No.: US 9,053,140 B2
(45) Date of Patent: Jun. 9, 2015

(54) ENHANCED B-TREES WITH RECORD MERGING

(71) Applicant: Apple Inc., Cupertino, CA (US)

(72) Inventors: Wenguang Wang, San Jose, CA (US); David A. Majnemer, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 342 days.

(21) Appl. No.: 13/630,206

(22) Filed: Sep. 28, 2012

(65) Prior Publication Data

US 2013/0204902 A1    Aug. 8, 2013

Related U.S. Application Data

(60) Provisional application No. 61/594,946, filed on Feb. 3, 2012.

(51) Int. Cl.
*G06F 17/30* (2006.01)

(52) U.S. Cl.
CPC .................. *G06F 17/30327* (2013.01)

(58) Field of Classification Search
USPC ................................. 707/791, 797
See application file for complete search history.

(56) References Cited

U.S. PATENT DOCUMENTS

| 4,945,475 | A | 7/1990 | Bruffey |
| 5,283,894 | A | 2/1994 | Deran |
| 7,953,717 | B2 * | 5/2011 | Graefe ........................ 707/704 |
| 2003/0126143 | A1 * | 7/2003 | Roussopoulos et al. ...... 707/100 |
| 2008/0082574 | A1 * | 4/2008 | Hosokawa ............... 707/103 R |
| 2009/0182709 | A1 | 7/2009 | Ritchie |
| 2010/0106687 | A1 | 4/2010 | Marcy |
| 2013/0103671 | A1 * | 4/2013 | Tretjakov et al. ............ 707/716 |
| 2013/0103678 | A1 * | 4/2013 | Tretjakov et al. ............ 707/723 |

* cited by examiner

*Primary Examiner* — Hung T Vy
(74) *Attorney, Agent, or Firm* — Fish & Richardson P.C.

(57) ABSTRACT

In some implementations, a B+tree (b plus tree) can provide concurrent access to data while modifying nodes of the B+tree. In some implementations, a top-down B+tree can be provided where nodes of the B+tree can be proactively merged, rebalanced and split to prevent recursive operations moving up the B+tree. In some implementations, node (or page) record data can be merged to consolidate record entries within nodes of the B+tree while only locking 1-3 nodes of the tree at the same time. In some implementations, record data can be merged across multiple nodes of the B+tree. In some implementations, ranges of data can be removed from the tree while only locking 1-3 nodes of the tree at the same time. In some implementations, range of data can be replaced with new data while only locking 1-3 nodes of the tree at the same time.

12 Claims, 12 Drawing Sheets

ENHANCED B-TREES WITH RECORD MERGING

CROSS-REFERENCE TO RELATED APPLICATION

This application claims priority to U.S. Provisional Application No. 61/594,946, filed on Feb. 3, 2012, which is incorporated by reference herein.

TECHNICAL FIELD

The disclosure generally relates to data management using B-trees.

BACKGROUND

B-trees are commonly used for managing data in computer systems. For example, B-trees can be used to manage file system data in a computer system. B-trees can be used to manage databases. B-trees can be used to map logical storage addresses to physical storage addresses and can provide fast and efficient data insertion, deletion, and lookup.

SUMMARY

In some implementations, a B+tree (b plus tree) can provide concurrent access to data while modifying nodes of the B+tree. In some implementations, a top-down B+tree can be provided where nodes of the B+tree can be proactively merged, rebalanced, and split to prevent recursive operations moving up the B+tree. In some implementations, node (or page) record data can be merged or rebalanced to consolidate record entries within nodes of the B+tree. In some implementations, record data can be merged or rebalanced across multiple nodes of the B+tree.

Particular implementations provide at least the following advantages: Implementations described herein provide for fast and efficient B+tree lookups, highly concurrent insert, delete, and lookup operations and improved data consistency across the B+tree.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

B+Tree

Figure 1:
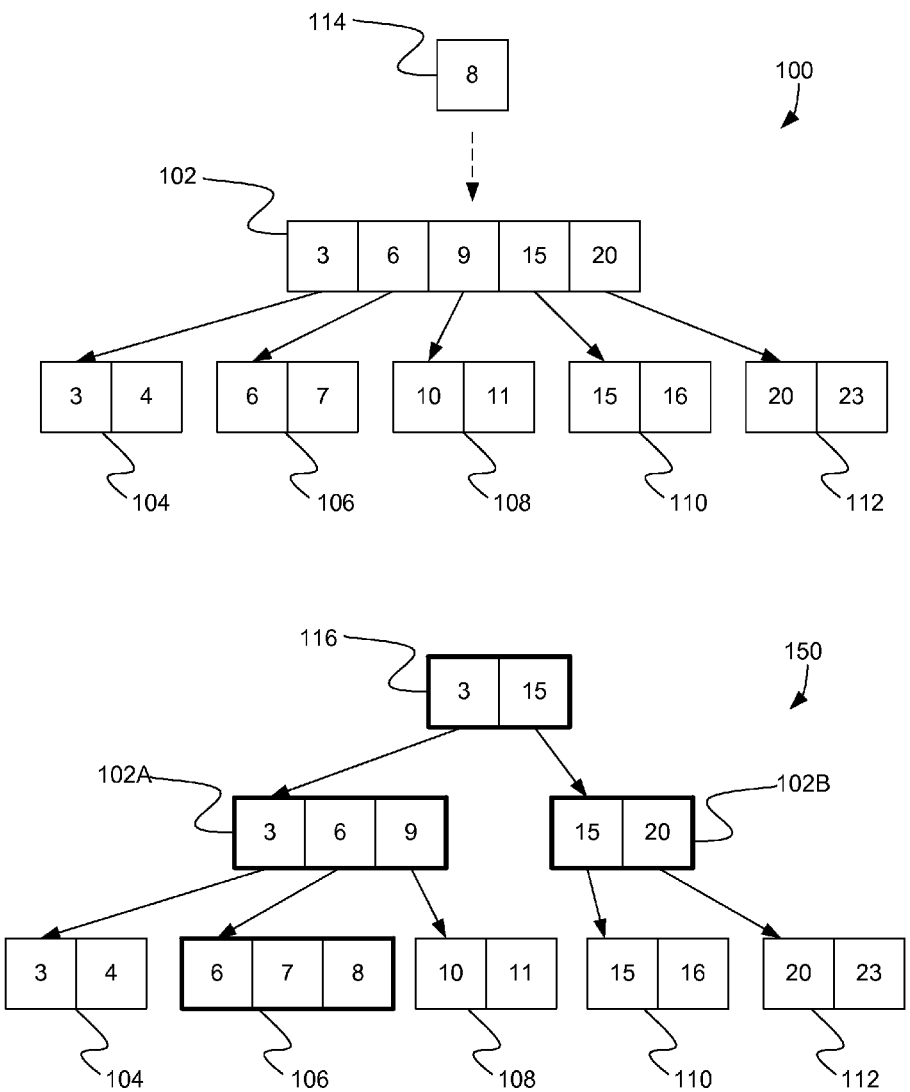
FIG. 1 illustrates example B+tree graphs for demonstrating the effect of a record insertion operation on a B+tree.

A B+tree is a type of tree which represents sorted data in a way that allows for efficient insertion, retrieval and removal of records, each of which is identified by a key. It is a dynamic, multilevel index, with maximum and minimum bounds on the number of keys in each index segment (e.g., block, page, node). In a B+tree, all records are stored at the leaf level of the tree; only keys are stored in the interior nodes.

The primary value of a B+tree is in storing data for efficient retrieval in a block-oriented storage context (e.g., filesystems). This is primarily because B+trees have a very high fanout, which reduces the number of I/O (input/output) operations required to find an element in the tree.

The order, or branching factor b of a B+tree measures the capacity of nodes (e.g., the number of children nodes) for internal nodes in the tree. The actual number of children for a node, referred here as m, is constrained for internal nodes such that $[b/2] \leq m \leq b$. The root node is an exception: the root node is allowed to have as few as two children. For example, if the order of the B+tree is 7, each internal node (except for the root) can have between 4 and 7 children. However, the root can have between 2 and 7 children. Leaf nodes have no children, but are constrained so that the number of keys must be at least $[b/2]$ and at most $b-1$. In the situation where a B+tree is nearly empty, it only contains one node, which is a leaf node (and the root node). Other constraints for B+trees can be used. For example, B+trees can be constrained to having between b and $2b-1$ entries per node. B+trees can be constrained to having between b and $2b+1$ entries per node. B+trees can be constrained to having between b and 3b entries per node, for example.

As records are added to or deleted from the B+tree, the B+tree can be rebalanced based on the constraints of the B+tree. For example, when a record is added to the B+tree, a search is performed to determine which leaf node (e.g., leaf node 'A') the new record should go into. For example, the record can be associated with a key (e.g., search key) that can be compared to keys within nodes of the B+tree to determine how to traverse the B+tree. If the leaf node is not full (e.g., the node has less than $b-1$ records), the record can be inserted into the node. If the leaf node is full, (e.g., the node has $b-1$ records), the leaf node can be split into two leaf nodes. For example, a new leaf node (leaf node 'B') can be allocated and half of the records from leaf node A can be moved into leaf node B. Once the leaf node B is allocated and filled, the parent node ('P') of nodes A and B can be updated with the smallest key of leaf node B and a pointer (e.g., address) to leaf node B. If the parent node P is full, the parent node P must be split and the parent's parent (e.g., parent node of P) must be updated.

Thus, when a new record is added that causes a node to split, an upward traversal of the tree can be required to update each parent of the split nodes.

When a record is removed from the B+tree, a search is performed to determine which leaf node ('L') contains the record. Once leaf node L is found, the record can be removed from leaf node L. Once the record is removed, if leaf node L is at least half-full the removal operation is complete. If leaf node L is not at least half full, a redistribution of records can be performed. For example, records can be moved from sibling leaf nodes ('S') into leaf node L. A sibling leaf node S is an adjacent node with the same parent as L. If records cannot be redistributed from node S (e.g., redistribution would leave S less than half full), node L and node S can be merged. If L and S are merged, the parent node ('P') of L and S must be updated by removing the entry pointing to L or S (depending on which node remains after the merge). Similarly, removal of an entry in node P can cause a merge of P and P's sibling. Thus, when a record is removed from the B+tree, an upward traversal of the tree can be required to update each parent of the merged nodes.

In some implementations, an upward traversal and modification of nodes can cause concurrency problems. For example, an insertion or deletion of a record can cause a subsequent modification of nodes upward through the tree from leaf to root. If the B+tree is designed for concurrent access, each node that may be modified must be locked (e.g., read lock, write lock, exclusive lock, etc.). For example, every node from root to leaf will need to be locked just in case a merging or splitting of nodes occurs. If the entire path from root to leaf is locked, other processes will not be able to access the data within the tree while the insertion or deletion operation is performed. Additionally, if another process has locked nodes along the upward path toward the root, a deadlock situation can occur.

Top-Down B+Tree

In some implementations, a top-down B+tree can be provided that avoids upward traversal of the B+tree and allows for locking only a portion of the B+tree when performing insertion and deletion operations. For example, the B+tree can be used to manage logical address to physical address mapping for file systems and databases. An insertion operation can be initiated when a memory or storage location is allocated for a file or a record in a database. A removal operation can be initiated with a memory or storage location is deleted (e.g., a file or record is deleted). The top-down B+tree can be implemented by employing a proactive approach to rebalancing the B+tree when an insert record or delete record operation is performed. Since operations and node locking are performed along a downward path (e.g., top-down) from root to leaf, deadlocking within the tree can be avoided.

Proactively Splitting Nodes

FIG. 1 illustrates example B+tree graphs 100 and 150 for demonstrating the effect of a record insertion operation on a B+tree. B+tree graph 100 can be configured to have a minimum node size of two and a maximum node size of five, for example. B+tree graph 100 can include root node 102 and leaf nodes 104-112. In some implementations, an insert operation can be performed on B+tree graph 100. For example, record 114 having a key value of eight (8) can be inserted into B+tree graph 100. As described above, with standard B+tree graphs, records are inserted into leaf nodes and then node splits are performed in a bottom-up fashion as needed. This requires both a downward and upward traversal of the B+tree to insert records (down) and rebalance the B+tree (up).

In some implementations, when an insert record operation is performed, nodes can be proactively split while traversing down the B+tree from root node to leaf node. For example, when a node with the maximum number of entries is encountered while traversing down the B+tree, the node can be split in anticipation of the insertion operation requiring a splitting of a leaf node. Referring to B+tree graph 100, when record 114 is inserted into B+tree graph 100, a downward traversal of the graph is performed to determine where record 114 should be inserted. While traversing down the tree, each node can be analyzed to determine whether the node has the maximum number of entries (e.g., five entries). For example, node 102 has the maximum number of five entries. When node 102 is determined to have the maximum number of entries, node 102 can be split as illustrated by B+tree graph 150 thus preventing an upward traversal of the B+tree to rebalance the tree.

As can be seen in resulting B+tree graph 150, node 102 has been split into node 102A and 102B and new root node 116 has been created and includes keys associated with nodes 102A and 102B. Record 114 has been inserted into leaf node 106.

Proactively Merging/Rebalancing Nodes

Figure 2:
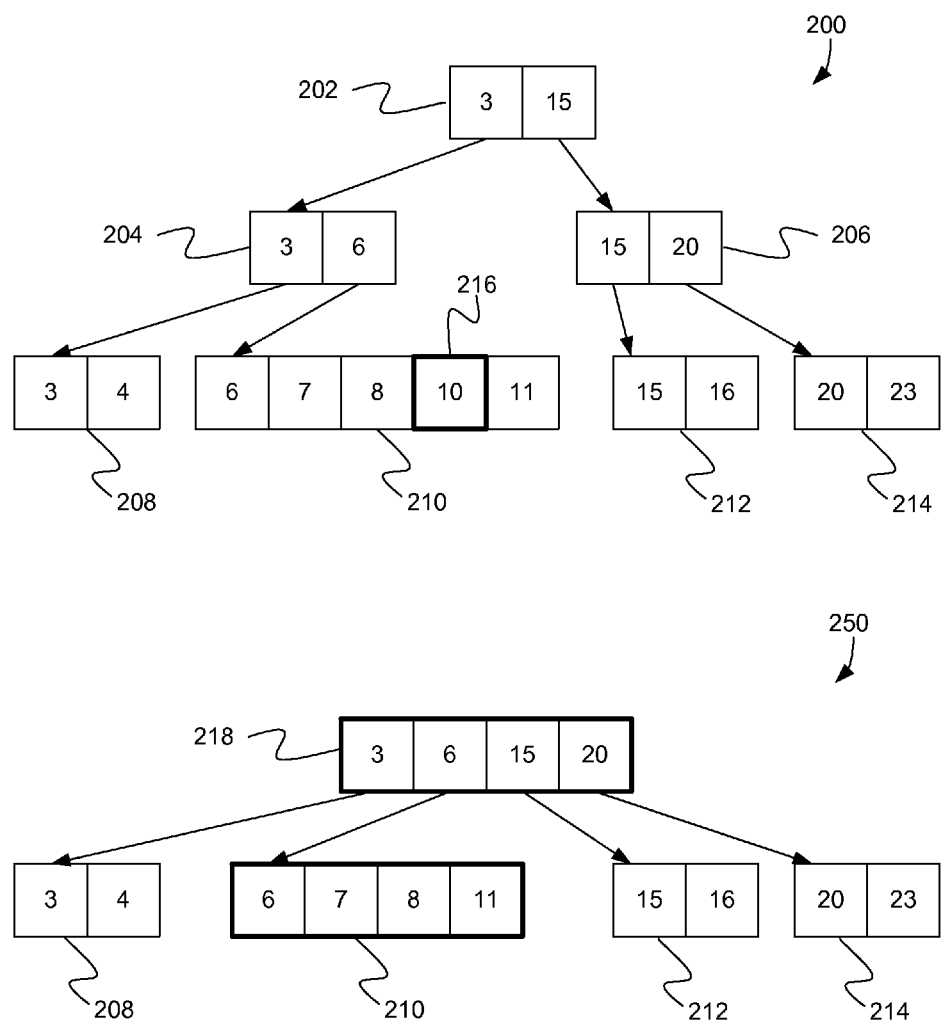
FIG. 2 illustrates example B+tree graphs for demonstrating the effect of a record removal operation on a B+tree.

FIG. 2 illustrates example B+tree graphs 200 and 250 for demonstrating the effect of a record removal operation on a B+tree. B+tree graph 200 can include root node 202, interior nodes 204 and 206 and leaf nodes 208-214. In some implementations, when a remove record operation is performed, nodes can be proactively merged while traversing down the B+tree from root node to leaf node. For example, when a node with the minimum number of entries is encountered while traversing down the B+tree, the node can receive records redistributed from sibling nodes or merged with sibling nodes in anticipation of the removal of the record requiring a merging of a leaf node. Thus, when a remove operation is performed for record 216 and node 204 is reached on the downward traversal, node 204 can be analyzed to determine if node 204 has the minimum number of entries (e.g., two). If node 204 has the minimum number of entries, removal of a record may cause node 204 to lose an entry and require a merging of node 204 with a sibling node. In anticipation of the potential merge, node 204 can be proactively merged with node 206 during the downward traversal of the B+tree.

As can be seen in the resulting B+tree graph 250, node 204 has been merged with node 206 resulting in node 218. After the merge, root node 202 is no longer needed and has been removed. Node 218 is now the root node. Record 216 has been removed from leaf node 210.

Concurrency

In some implementations, the top-down B+tree can provide for improved concurrency. For example, by proactively merging, rebalancing and splitting nodes during the downward traversal of the tree, nodes can be locked, modified and unlocked allowing for access to the unlocked nodes by other processes within the system. Also, deadlocking caused by simultaneous upward and downward traversal of the tree by two different processes can be avoided, as described above, because locks are always taken in the same top-down order for lookup, insert, and delete operations.

In some implementations, during the descent through the B+tree lock-coupling can be used. Lock coupling (i.e., crabbing) is locking children nodes before unlocking the parent node. This ensures validity of a tree-path that an operation (insertion, deletion) is traversing without pre-locking the entire path. Crabbing is deadlock free. For example, when traversing the B+tree non-exclusive read locks can be obtained on parent and children nodes. However, when modifying nodes, an exclusive lock can be obtained before the read locks are released on the parent and children (e.g., the read lock can be promoted to an exclusive write lock). For example, if splitting node 102 (FIG. 1) or merging nodes 204 and 206 (FIG. 2) is required, nodes 102, 204 and 206 and their immediate ancestors (e.g., nodes 116 and 202) need to be locked (e.g., exclusive write lock) since nodes 102, 204 and 206 and the immediate ancestors of nodes 102, 204 and 206 are effected by the proactive merge or split, as described above. Once the node modifications have occurred and the downward traversal of the tree moves to the children of nodes 102, 204 and 206, the parents of nodes 102, 204 and 206 (e.g., nodes 116 and 202) can be unlocked allowing for access by other processes. Thus, during a tree traversal that includes a proactive merge and/or split, only the parent node and the children node need be locked.

Address Mapping Using B-Trees

Figure 3:
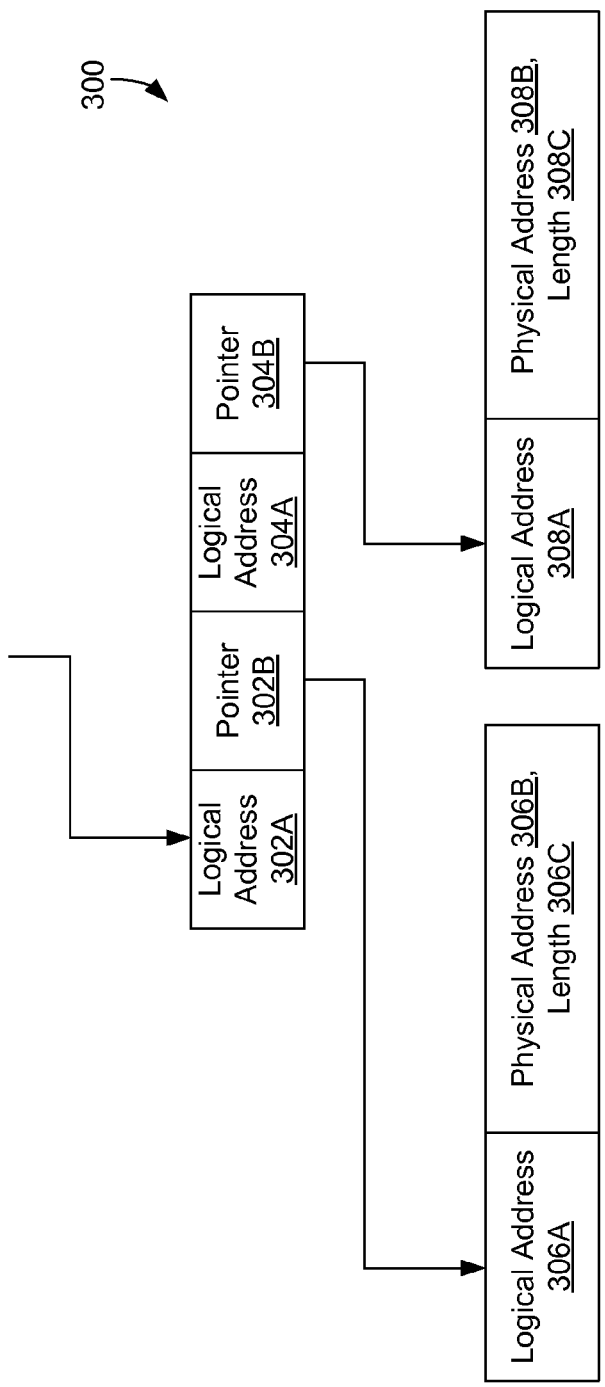
FIG. 3 illustrates an example portion of a B+tree for mapping logical addresses to physical addresses.

FIG. 3 illustrates an example portion of a B+tree 300 for mapping logical addresses to physical addresses. For example, B+tree 300 can be used by file systems and/or databases to quickly and efficiently lookup physical storage addresses based on logical addresses. In some implementations, the keys of B+tree 300 can correspond to logical addresses associated with storage locations (e.g., a block address) on a storage medium. Each interior node (and root node) can include entries containing keys (e.g., logical address 302A and 304A) and pointers or addresses (e.g., 302B and 304B) to child nodes. Leaf nodes can include records that have keys (e.g., logical address 306A and 308A) and data. The data can include a physical address (e.g., 306B and 308B) of a storage location and the length (e.g., number of blocks) of data stored at the physical address (e.g., 306C and 308C). For the remainder of this specification the following record notation will be used to identify a record: [logical address: physical address, length]. For example, the record notation [10:100, 5] can identify the record having the logical address ten (10), the physical address 100 and length five (5). Thus, given a logical address for data (or a range of logical addresses), the B+tree can be used to lookup the physical address for the data.

Inserting and Merging Records

In some implementations, record insertion operations can be performed without increasing the number of entries in a node. In some implementations, combining records can cause a reduction in the number of records maintained by the B+tree.

Figure 4:
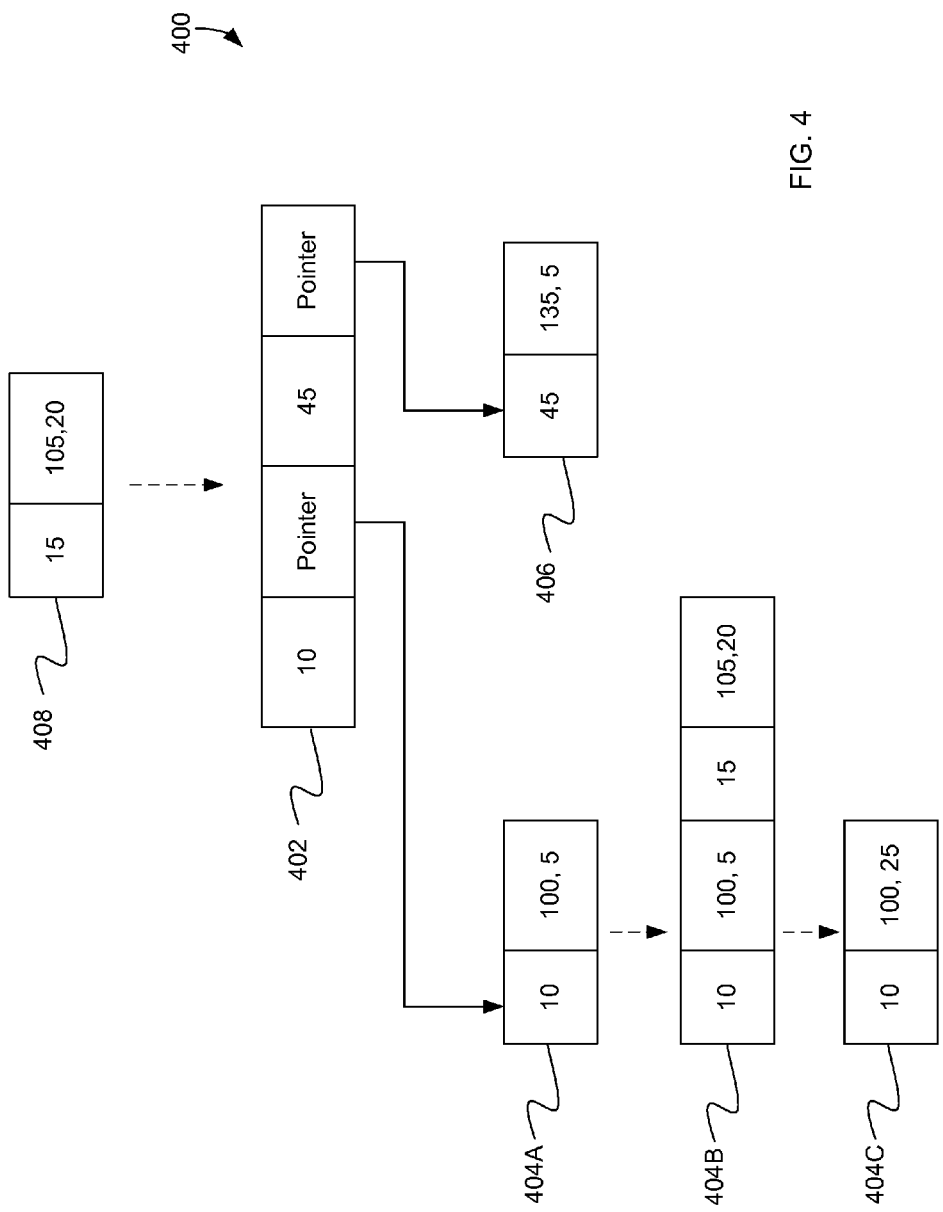
FIG. 4 illustrates an example B+tree graph for demonstrating merging a new record with the last record in a B+tree leaf node.

FIG. 4 illustrates an example B+tree graph 400 for demonstrating merging a new record with the last record in a B+tree leaf node. The B+tree of graph 400 can include an interior (or root) node 402 that includes two entries (10, 45). Node 402 can point to leaf nodes 404A and 406. Leaf node 404A can include a record (e.g., data) [10: 100, 5]. The record can be the last record in leaf node 404A, for example.

In some implementations, when a record (e.g., record 408) is added to the B+tree, the new record can be combined or merged with an existing record. For example, if the addresses specified by the new record are adjacent to the addresses of an existing record or records, the adjacent records can be merged. To illustrate, when record 408 [15: 105, 20] is inserted into the B+tree, record 408 can be added to node (i.e., page) 404A to generate node 404B. However, node 404A contains record [10: 100, 5] covering logical addresses 10-15 (e.g., logical address 10 plus length 5) and physical addresses 100-105 (e.g., physical address 100 plus length 5). Since new record 408 starts at logical address 15 and physical address 105, the addresses of the new record 408 are adjacent to the existing record and can be merged with the existing record. The merging of the new record 408 with the existing record can result in node 404C that includes the merged record having logical address 10, physical address 100 and length 25. Note that the number of records in node 404A (404C) has not changed.

Figure 5:
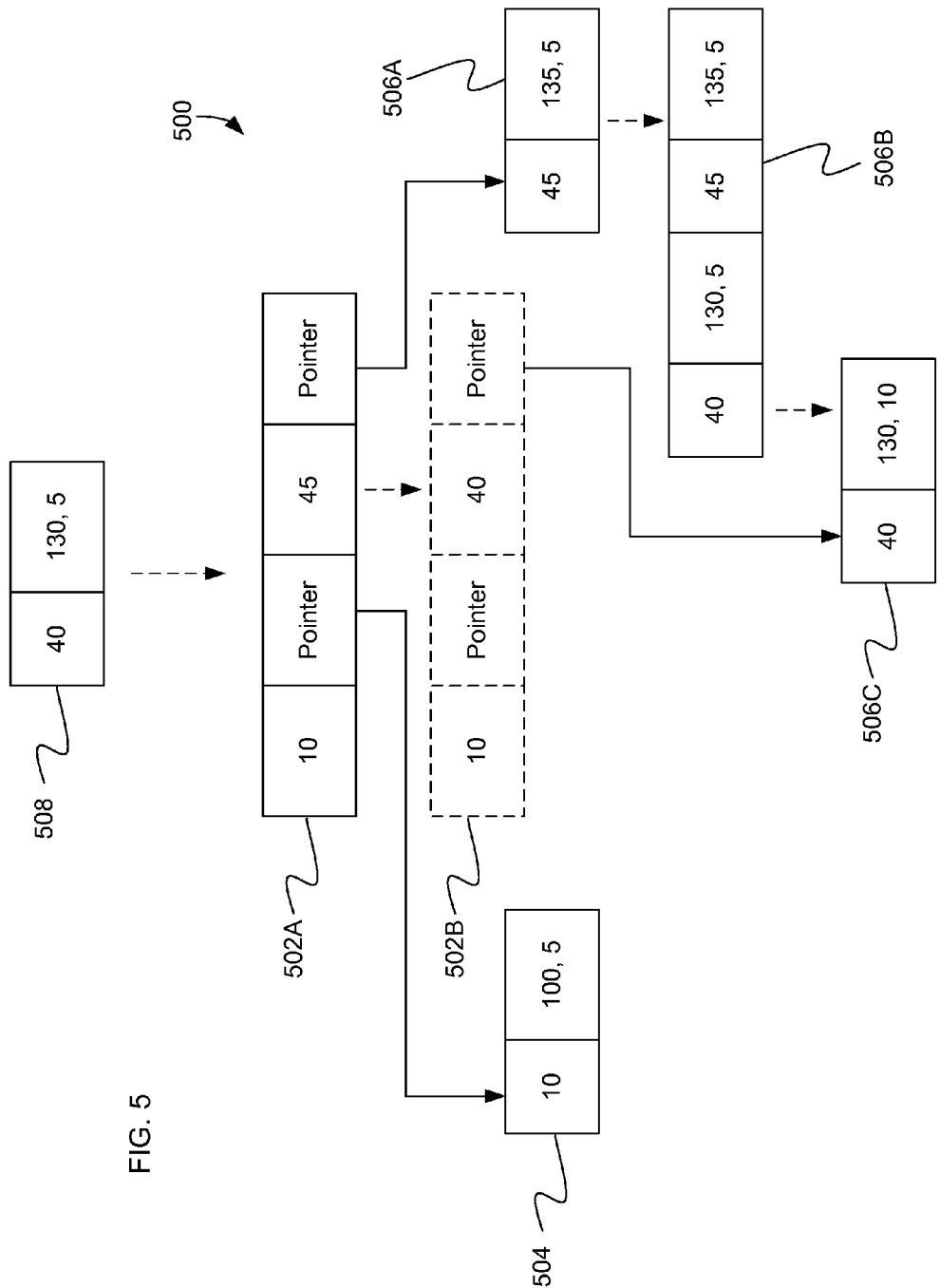
FIG. 5 illustrates an example B+tree graph for demonstrating merging a new record with the first record in a B+tree leaf node.

FIG. 5 illustrates an example B+tree graph 500 for demonstrating merging a new record with the first record in a B+tree leaf node. Graph 500 can have an interior (or root) node 502A having two entries (e.g., keys, logical addresses and pointers) associated with keys ten and forty five (10, 45). Interior node 502A can point to leaf nodes 504 and 506A. Leaf node 506A can include record [45:135, 5]. Record [45: 135, 5] can be the first record of leaf node 506A.

In some implementations, when a record (e.g., record 508) is added to the B+tree, the new record can be combined or merged with an existing record. For example, if the addresses specified by the new record are adjacent to the addresses of an existing record or records, the adjacent records can be merged. To illustrate, when record 508 is inserted into the B+tree, record 508 can be added to node (i.e., page) 506A to generate node 506B. However, new record [40: 130, 5] covers logical addresses 40-45 (e.g., logical address 40 plus length 5) and physical addresses 130-135 (e.g., physical address 130 plus length 5). Since new record 508 ends at logical address 45 and physical address 135, the addresses of the new record 508 are adjacent to the existing record [45: 135, 5] and the new record 508 can be merged with the existing record. The merging of the new record 508 with the existing record can result in node 506C that includes the merged record having logical address 40, physical address 140 and length 10. Once the merged record [40: 130, 10] is generated, node 502A can be updated with the smallest key (e.g., logical address 40) from node 506C to generate updated interior node 502B. Note again that the number of records in node 506A (506C) has not changed with the insertion of the new record.

Figure 6:
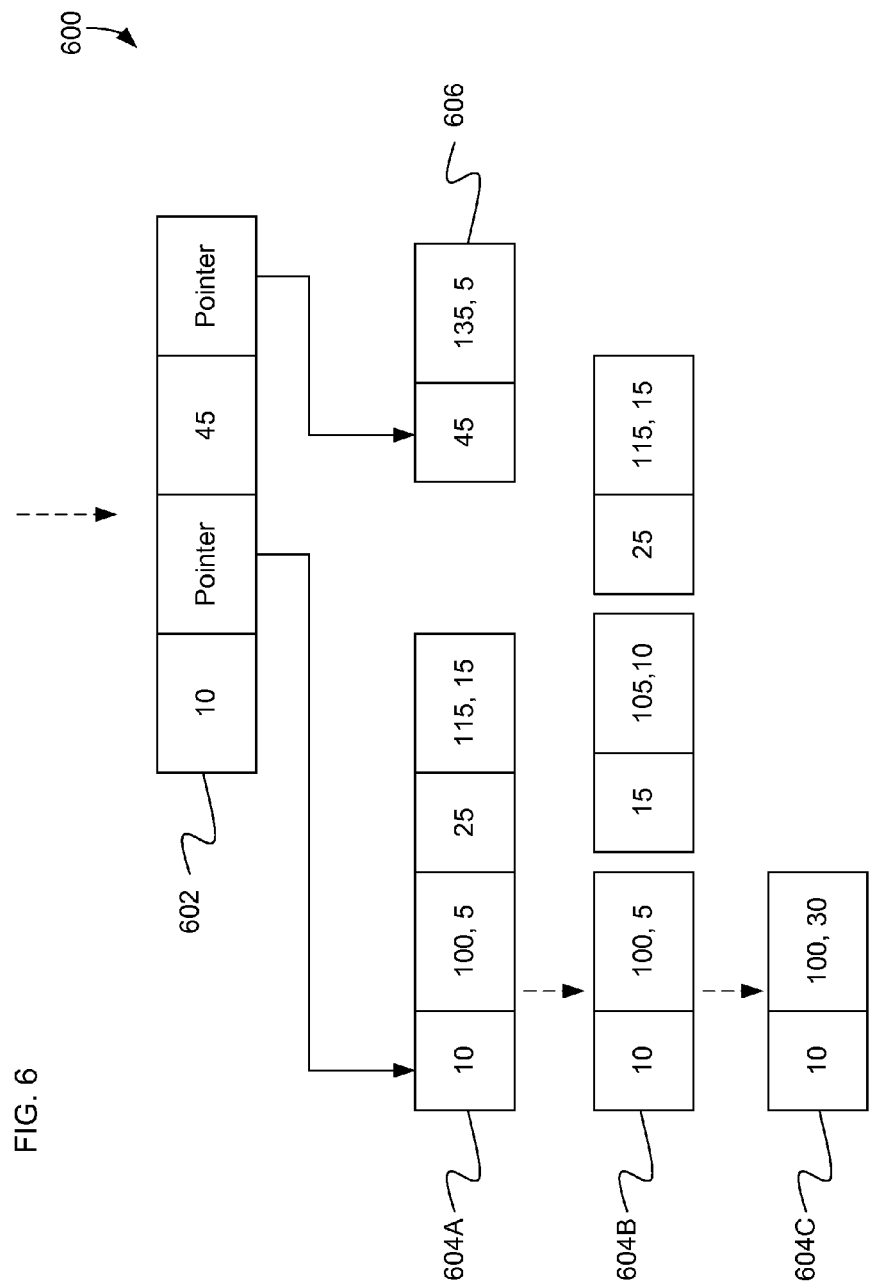
FIG. 6 illustrates an example B+tree graph for demonstrating merging a new record with two records in a single B+tree leaf node.

Record Insertions that Reduce the Number of Node Entries Merging Records within Single Node FIG. 6 illustrates an example B+tree graph 600 for demonstrating merging a new record with two records in a single B+tree leaf node. For example, if a new record fits exactly between two existing records in a leaf node of the B+tree, the three records (e.g., the new record and the two existing records) can be merged into a single record. Thus, the number of records within the node can be reduced by one when adding a new record.

Graph 600 illustrates this scenario. For example, a B+tree can include interior (or root) node 602. Node 602 can include entries (10, 45) that point to leaf nodes 604A and 606. Leaf node 604A can include records [10: 100, 5] and [25: 115, 15]. The records of leaf node 604A cover addresses [10-15, 100-105] and [25-40, 115-130]. If record 608 is inserted into the B+tree, record 608 can be added to node 604A to generate node 604B. However, because record 608 (e.g., record [15: 105, 10]) covers addresses [15-25, 105-115], record 608 is adjacent to and fits between both records in leaf node 604A.

Thus, record 608 can be merged with both of the records in leaf node 604A to generate record node 604C having a single record [10: 100, 30]. Thus, the number of entries in leaf node 604A has been reduced from two records to one record (e.g., leaf node 604C) when inserting record 608 into the B+tree.

Proactively Merging, Rebalancing and Splitting Nodes

In some implementations, nodes can be proactively split, rebalanced or merged while traversing the B+tree from root to leaf. For example, some insertion operations can reduce the number of entries in a node of a B+tree, as described with reference to FIGS. 6 and 7. Thus, in some implementations, an insertion operation can cause a merging of nodes rather than requiring a splitting of nodes. To account for the need to merge nodes in response to an insertion operation, in some implementations, as the B+tree is traversed during an insertion operation, nodes along the tree-path being traversed can be merged/rebalanced and/or split. For example, in response to an insertion operation and during tree traversal, if a node is encountered that has the maximum number of entries, the node can be proactively split, as described above. During the same insertion operation and tree traversal, if a node is encountered that has the minimum number of entries, the node can be proactively merged or rebalanced, as described above. By proactively merging, rebalancing and splitting nodes during the insertion tree traversal instead of just proactively splitting nodes, as described above, bottom up tree traversals can be avoided when an insertion causes a reduction in the number of node entries.

Merging Records Across Multiple Leaf Nodes

Figure 7:
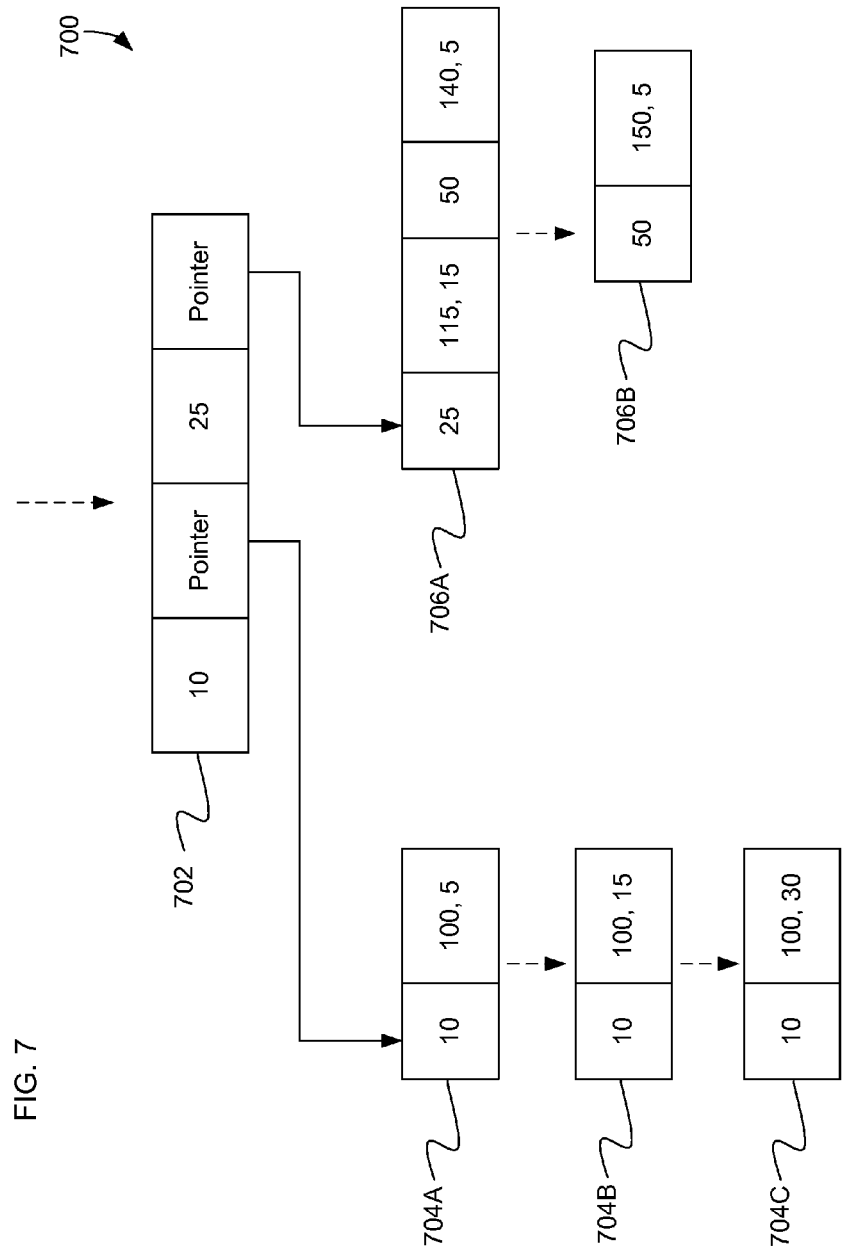
FIG. 7 illustrates an example B+tree graph for demonstrating merging a new record with records in a separate B+tree leaf nodes.

FIG. 7 illustrates an example B+tree graph 700 for demonstrating merging a new record with records in a separate B+tree leaf nodes. For example, the B+tree of graph 700 can include interior (or root) node 702. Node 702 can include entries (10, 25) that point to leaf nodes 704A and 706A. Record 708 [15: 105, 10] can be inserted into the B+tree. For example, record 708 can be inserted into node 704A and merged with the last record of node 704A. Alternatively, record 708 can be inserted into node 706A and merged with the first record of node 706A.

In some implementations, when a record is inserted or merged at the end of leaf node (e.g., the first record or the last record of the node), the adjacent leaf node can be analyzed to determine if records should be merged across the leaf nodes. In some implementations, if a record is merged with the last record in a leaf node, the next leaf node in the B+tree can be analyzed to determine if a record merge can be performed across the leaf nodes. For example, if leaf node record 708 is inserted into leaf node 704A, record 708 can be merged with record [10: 100, 5] to generate leaf node 704B and record [10:100, 15]. If record [10: 100, 15] is the last record in leaf node, then the next adjacent leaf node 706A can be analyzed to determine if a record merge can be performed between leaf node 704B and leaf node 706A. In this case, the first record of leaf node 706A is record [25:115, 15] and can be merged with record [10:100, 15] of leaf node 704B to generate record [10:100, 30] of leaf node 704C. Additionally, when record [25:115, 15] is merged into leaf node 704B, record [25:115, 15] will be removed from leaf node 706A thereby generated leaf node 706B. Once record [25: 115, 15] is removed from leaf node 706A to generate leaf node 706B, interior node 702 can be updated with the smallest key of leaf node 706B (e.g., 50). It should be noted here that the total number of records across leaf nodes 704A and 706A has been reduced by one as a result of the insert and merge. Thus, in some implementations, the proactive merge and split described above will be performed with each record insertion.

Similarly, if a record is merged with the first record in a leaf node, the previous leaf node in the B+tree can be analyzed to determine if a record merge can be performed across the leaf nodes. In some implementations, if a record is inserted in the first or last position within a leaf node, the previous or next leaf node can be analyzed to determine if a record merge can be performed across the leaf nodes.

Closest Common Ancestor

In some implementations, when merging records across leaf nodes, an exclusive (e.g., write) lock can be obtained for all nodes from the closest common ancestor (e.g., lowest common ancestor) of the leaf nodes down to the leaf nodes containing the records to be merged. By obtaining an exclusive lock on only the nodes from the closest common ancestor down to the leaf nodes, the minimum number of nodes will be locked thereby allowing for concurrent access to the B+tree above the closest common ancestor node.

Figure 8:
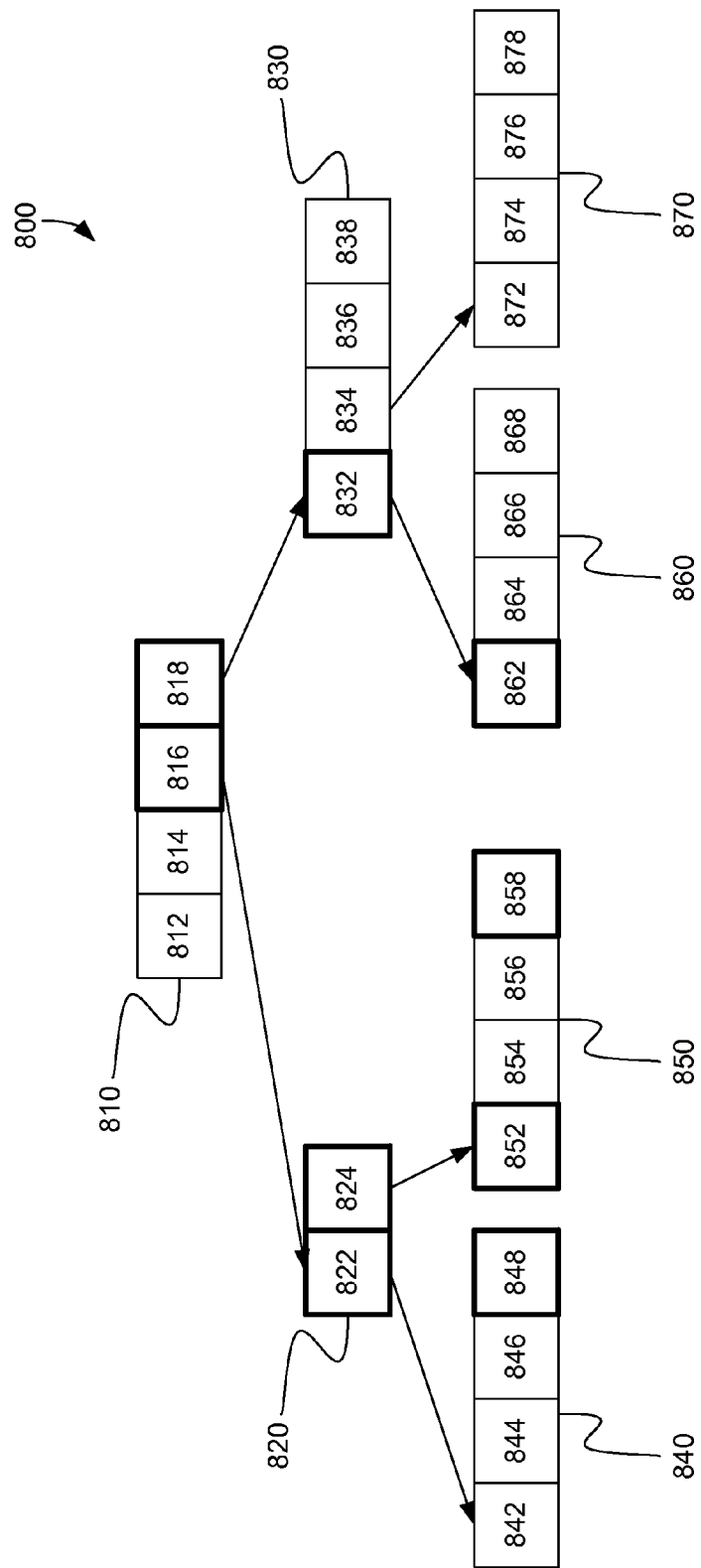
FIG. 8 illustrates an example B+tree graph 800 for demonstrating how the closest common ancestor of two nodes can be found within a B+tree.

FIG. 8 illustrates an example B+tree graph 800 for demonstrating how the closest common ancestor of two leaf nodes can be found within a B+tree. For example, the B+tree can include interior nodes 810, 820 and 830. Alternatively, node 810 can be the root node of the B+tree. Nodes 840, 850, 860 and 870 can be leaf nodes of the B+tree. Node 810 can have entries 812-818. Node 820 can have entries 822-824. Node 830 can have entries 832-838. Node 840 can have records 842-848. Node 850 can have records 852-858. Node 860 can have records 862-868. Node 870 can have records 872-878.

In some implementations, if a record is merged (or inserted) at the end of a leaf node (e.g., record 848), the system can try to merge record 848 (e.g., the last record of node 840) with record 852 (e.g., the first record of adjacent node 850). In order to merge records from node 840 with records from node 850 while allowing concurrent access to the B+tree, the closest common ancestor (e.g., node 820) of the nodes must be identified and all nodes between interior node 820 and leaf nodes 840 and 850 must be locked. Thus, to merge records from node 840 and 850 an exclusive lock must be obtained for nodes 820, 840 and 850.

In some implementations, if a record is merged (or inserted) at the beginning of a leaf node (e.g., record 862), the system can try to merge the record with a record of a previous adjacent node (e.g., record 858 of node 850). Again, to perform a record merge across two leaf nodes, the closest common ancestor of the two leaf nodes should be identified and all nodes between the closest common ancestor and the two leaf nodes should be locked. For example, if records 862 and 858 are to be merged, an exclusive lock should be obtained for node 810 (e.g., the closest common ancestor of nodes 850 and 860), node 820, node 830, node 850 and node 860.

In some implementations, an estimate of the closest common ancestor can be made during the initial insert and merge operation. For example, as the downward traversal from root node to leaf node is made for the insertion operation, the closest common ancestor can be identified as the interior node where the selected key and traversed link (e.g., pointer) is a middle entry (e.g., not the first entry and not the last entry) of the node. For example, entry 816 of node 810 is not the first or last entry of node 816. Thus, if the B+tree is traversed through entry 816 down to record 852, node 810 can be identified as the estimated closest common ancestor.

In some implementations, the closest common ancestor can be identified by a top-down traversal of the B+tree after the initial insert and merge has occurred. For example, when a record is inserted into the B+tree the record can be merged with the first (e.g., left most, record 852) or last (e.g., right most, record 858) record in a leaf node. If the record is inserted at or merged with the first (or last) record of a node, the system can try to merge the record with a previous (or next) adjacent node. When attempting to merge with an adjacent node, the B+tree can be traversed again in a top down (e.g., root to leaf or estimated closest common ancestor to leaf) fashion to the leaf node containing the merged record (e.g., record 852 or 858). As each node is touched during the tree traversal, the position of the key-pointer interior node entries on the traversal path can be analyzed to determine the closest common ancestor. For example, to get from node 810 to record 852 (e.g., first, left most record of node 850), interior node entries 816 and 824 must be traversed.

To find the closest common ancestor of node 850 and a previous node 840 when attempting to merge the first record 852 of node 850, each traversed interior node entry can be analyzed to determine if the entry occupies the left most position in the interior node. Traversal can start from the root node or the estimated closest common ancestor. For example, starting with node 810 and taking a top-down approach, it can be determined that entry 816 does not occupy the left most position in node 810 so node 810 can be identified as the closest common ancestor. However, when node 820 is traversed next, it can be determined that entry 824 does not occupy the left most position in node 820 (e.g., there is a previous node 840 to merge with). Thus, since node 820 is closer (e.g., is the closest ancestor) to leaf node 850 than node 810 and entry 824 of node 820 is not the left most entry, node 820 can be identified as the closest common ancestor of node 840 and node 850. Also, since the next node to be touched is leaf node 850 there can be no other closest common ancestor. Thus, node 820 is the closest common ancestor of node 840 and node 850.

To find the closest common ancestor of node 850 and node 860 while attempting to merge the last record 858 of node 850, each traversed interior node entry can be analyzed to determine if the entry occupies the right most position in the interior node. Traversal can start from the root node or the estimated closest common ancestor. For example, starting with node 810 and taking a top-down approach, it can be determined that entry 816 does not occupy the right most position in node 810 so node 810 can be identified as the closest common ancestor. However, when node 820 is traversed next, it can be identified that entry 824 does occupy the right most position in node 820. Thus, node 820 is not the closest common ancestor. Also, because the next node to be touched is leaf node 850 there can be no other closest common ancestor and node 810 can be identified as the closest common ancestor of node 850 and node 860.

In some implementations, once a possible closest common ancestor is identified, exclusive locks can be obtained for the closest common ancestor and any descendants of the closest common ancestor along the tree-path to the leaf nodes containing the records to be merged (e.g., nodes 840 and 850). When a new or better closest common ancestor is identified, all locks above the new closest common ancestor can be released.

Delayed Merging of Records

In some implementations, the merging of records across leaf nodes (e.g., two different adjacent leaf nodes) can be delayed until a subsequent proactive merge is performed. For example, when the B+tree is configured to perform a proactive merge and split when inserting a record, the B+tree can be rebalanced by merging nodes that only have the minimum number of entries or records, as described above. During a proactive merging of leaf nodes, the records of adjacent leaf nodes can be analyzed to determine if the records can be merged, as described above. If the records can be merged (e.g., the records have contiguous addresses), then the records can be merged as part of the proactive merge operation.

Range Operations

In some implementations, range operations can be performed on the B+tree. For example, a range of records can be removed from the B+tree. A range of entries can be replaced in the B+tree. These range operations rely upon a range locking mechanism that provides an exclusive lock on a range of records while records within the locked range are removed and/or replaced.

Remove Range

Figure 9:
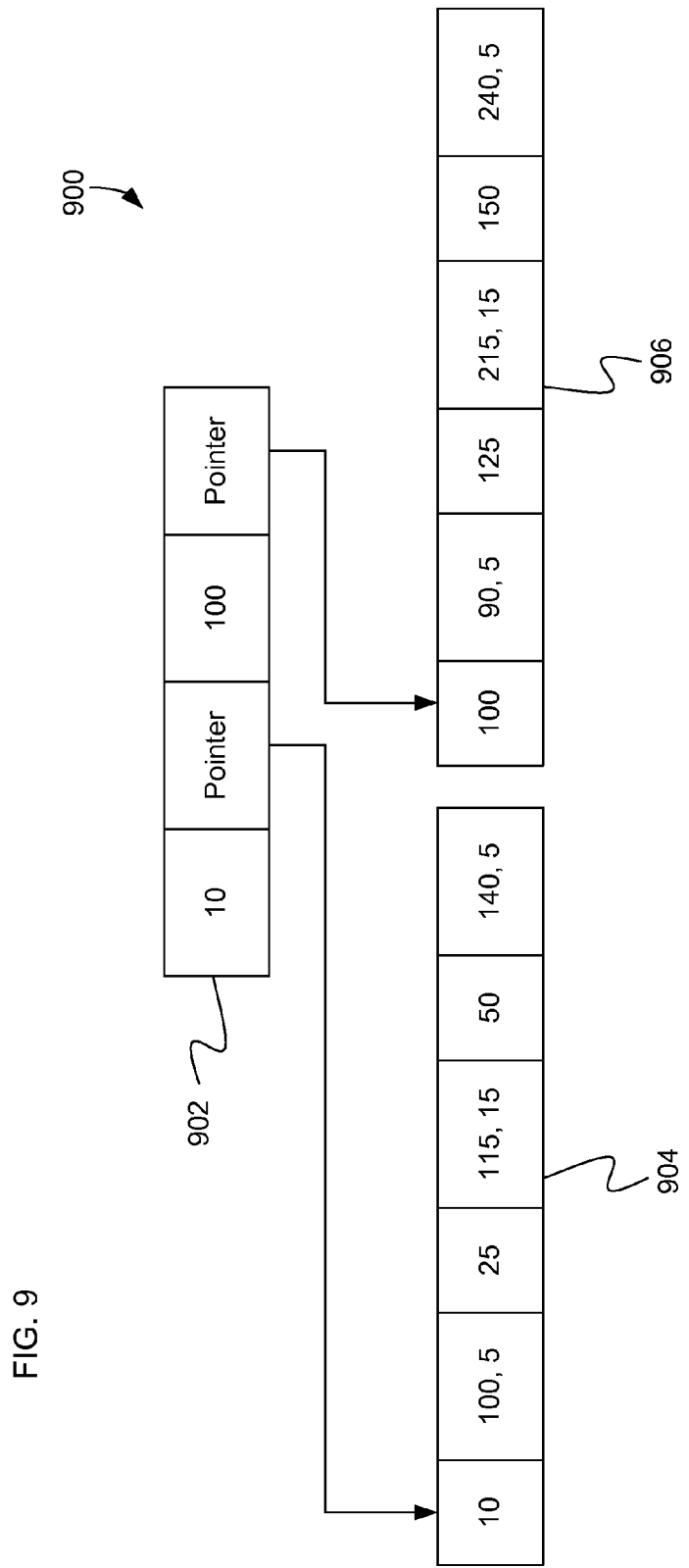
FIG. 9 illustrates an example B+tree graph for demonstrating the remove range operation.

FIG. 9 illustrates an example B+tree graph 900 for demonstrating the remove range operation. For example, the B+tree can include interior (or root) node 902 and leaf nodes 904. In some implementations, when the remove range operation is initiated, a range lock can be obtained on a range of records. For example, a remove range operation can be initiated to remove the range of entries corresponding to the logical addresses 25-105. When the remove range operation is initiated, a lock can be obtained on the records and/or nodes associated with the designated range. For example, a range lock can be obtained for node 904 and node 906.

Once the range lock is obtained, a proactive merge and split can be performed and records associated with the specified range can be removed from each node. For example, records can be removed from leaf node 904 until leaf node 904 reaches its minimum capacity (e.g., two records). Once leaf node 904 reaches minimum capacity, the process can start over to continue to remove the ranges left over. For example, the address range 25-100 can be adjusted to exclude the previously removed range (e.g., 25-100 can be adjusted to 40-100 after the record [25: 115, 15] has been removed from node 904), a proactive merge, rebalance and split can be performed to rebalance the B+tree and records can be removed from leaf node 904 or leaf node 906 as needed.

Replace Range

In some implementations, a replace range operation can be performed on the B+tree. For example, first the remove range operation can be performed followed by an insert with merge, as described with reference to FIGS. 4-7 and 9 above.

Example Processes

Figure 10:
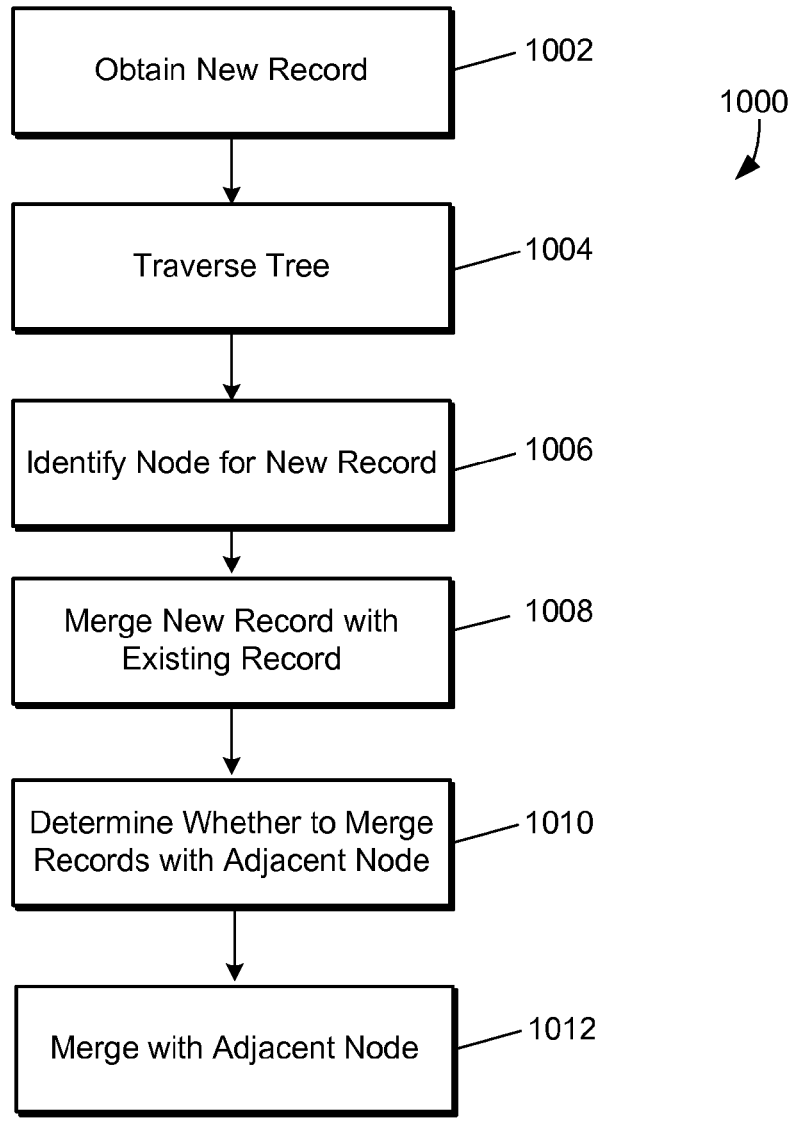
FIG. 10 is flow diagram of an example process for merging records during an B+tree insert operation.

FIG. 10 is flow diagram of an example process 1000 for merging records during an B+tree insert operation. At step 1002, a new record is obtained. For example, a new record can be obtained as part of an insertion operation on the B+tree.

At step 1004, the B+tree is traversed while proactively merging, rebalancing and splitting nodes. For example, in response to receiving a new record as part of an insertion operation, nodes along the insertion path through the tree can be proactively merged or rebalanced. In response to receiving a new record as part of an insertion operation, nodes along the insertion path through the tree can be proactively split.

At step 1006, a leaf node for the inserting the record is identified. For example, the key of the new record can be compared to keys of interior nodes and leaf nodes to determine the insertion path through the tree to the leaf node where the new record should be inserted. Thus, the leaf node for inserting the record can be identified based on the value of the key (e.g., logical address) of the new record.

At step 1008, the new record is merged with an existing record. For example, the new record can be compared to an existing neighboring record within the leaf node to determine if a record merge can be performed. If the new record and the existing record have contiguous addresses, then the new record and the existing record can be merged.

At step 1010, it is determined whether the merged record should be merged with an adjacent node. For example, if the new record is merged with the first record of the node, the previous node can be analyzed to determine if the first record of the node can be merged with the last record of the previous node. If the new record is merged with the last record of the node, the next node can be analyzed to determine if the last record of the node can be merged with the first record of the next node. If the new record is inserted or merged with a record in the middle of the node, the next and/or previous nodes will not be analyzed for record merging.

At step 1012, a record in a node is merged with a record from an adjacent node. The first record of a node can be merged with the last record of the previous adjacent node if the addresses of the records are contiguous. The last record of a node can be merged with the first record of the next adjacent node if the addresses of the records are contiguous. Once the records are merged, the tree can be updated and rebalanced as needed.

Figure 11:
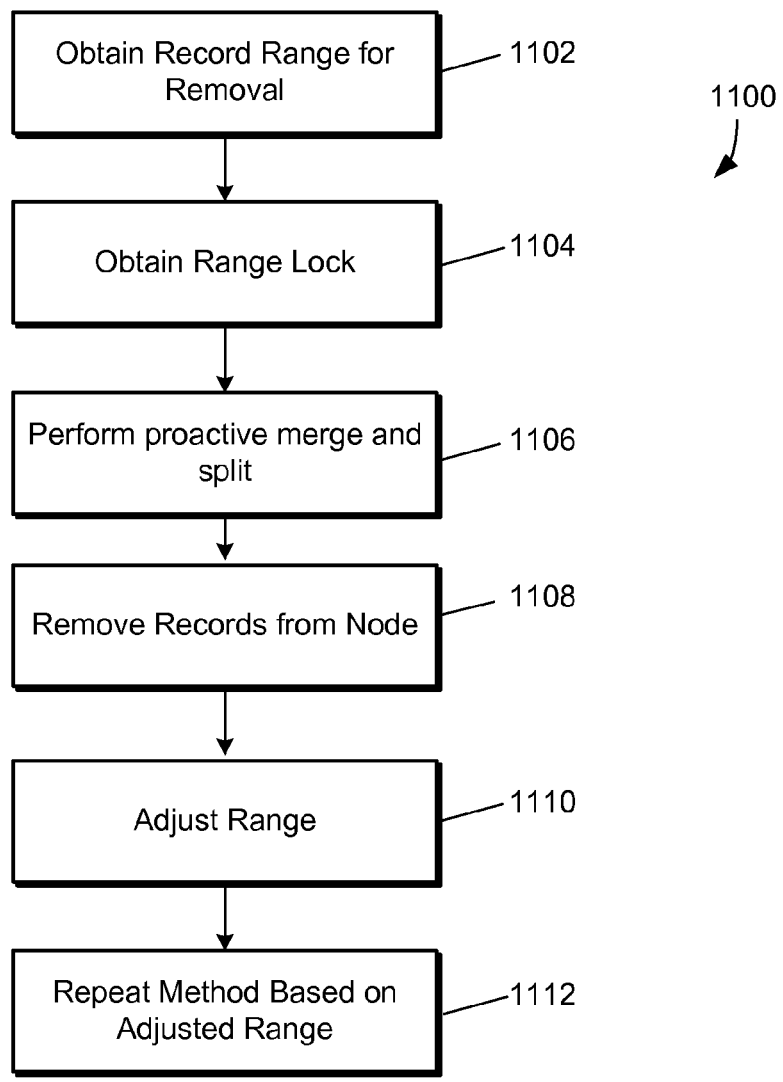
FIG. 11 is a flow diagram of an example process for removing a range of records.

FIG. 11 is a flow diagram of an example process 1100 for removing a range of records. At step 1102, a range of records is obtained. For example, a range of logical addresses to be removed can be specified by the operating system or an application of a computing device. The specified range can include a starting logical address (e.g., 25) and an ending logical address (e.g., 75).

At step 1104, a range lock is obtained. For example, a range lock can be obtained for the logical address range. The range lock can prevent other processes or threads from accessing records and/or data blocks associated with the logical addresses in the specified range.

At step 1106, a proactive merge and split is performed on the B+tree. Once the range lock is obtained, the tree can be traversed to determine which leaf nodes are associated with the specified range. As the tree is traversed from root to leaf, each node of the tree can be proactively split or merged, as described above.

At step 1108, records are removed from a leaf node. For example, once a leaf node associated with the specified range is identified, records falling within the specified range can be removed from the leaf node until the leaf node reaches its minimum capacity for records.

At step 1110, once the leaf node reaches minimum capacity or all relevant records are removed from the node, adjust the range. For example, if the range is (25-75) and records associated with the range (25-40) are removed from the node, the range can be adjusted to (40-75) to account for the records that have already been removed and no longer exist. At step 1112, repeat the method. For example, process 1100 can be repeated based on the modified range (40-75).

The paragraphs above discuss B-tree operations in terms of a B+tree implementations. However, as known to those familiar with B-trees, the B+tree implementations and operations can also be applied to and performed on other types or variations of B-trees. This disclosure is intended to cover other forms of B-trees in addition to the B+tree implementations described above.

Example System Architecture

Figure 12:
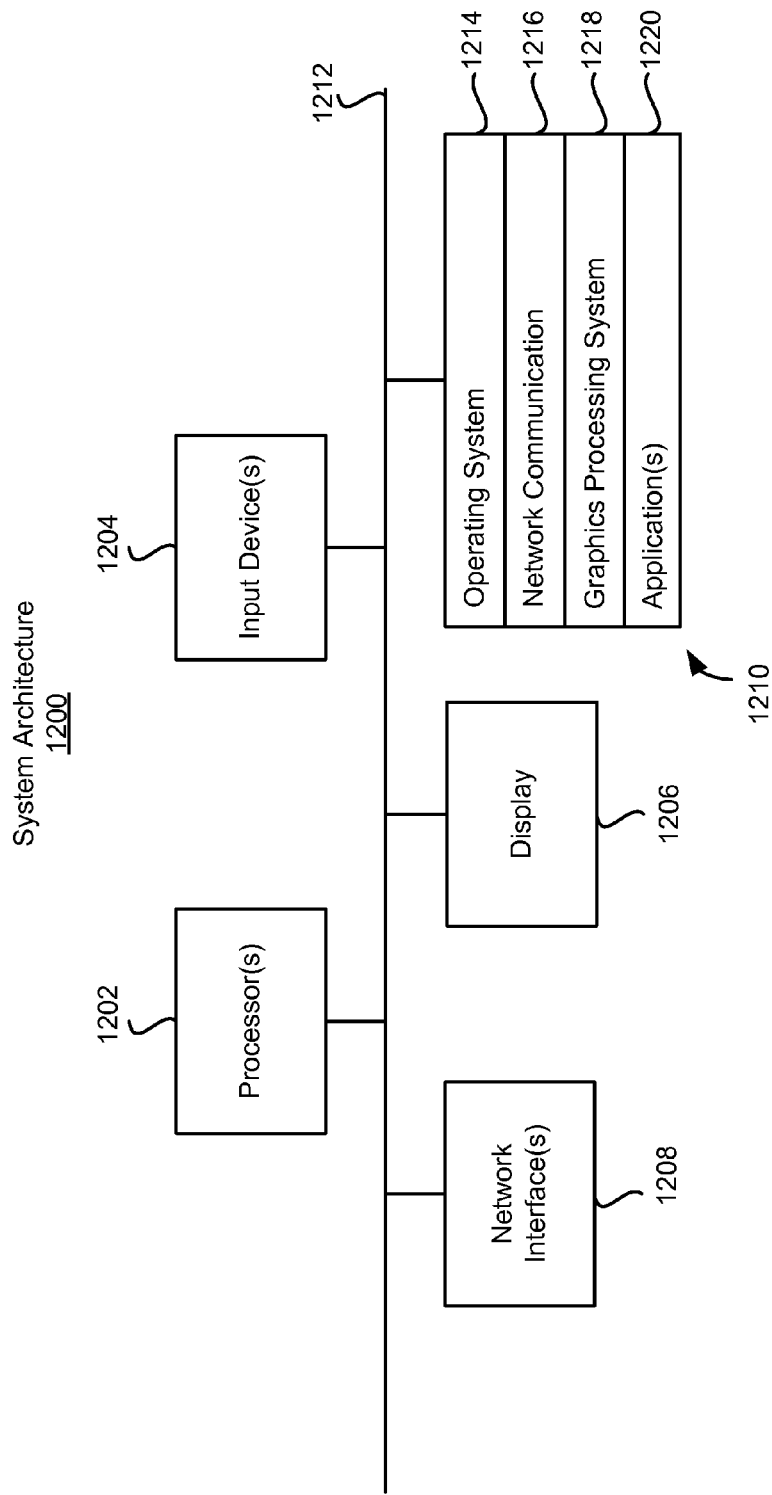
FIG. 12 is a block diagram of an exemplary system architecture implementing the features and processes of FIGS. 1-11.

FIG. 12 is a block diagram of an exemplary system architecture implementing the features and processes of FIGS. 1-11. The architecture 1200 can be implemented on any electronic device that runs software applications derived from compiled instructions, including without limitation personal computers, servers, network attached storage devices, smart phones, media players, electronic tablets, game consoles, email devices, etc. In some implementations, the architecture 1200 can include one or more processors 1202, one or more input devices 1204, one or more display devices 1206, one or more network interfaces 1208 and one or more computer-readable mediums 1210. Each of these components can be coupled by bus 1212.

Display device 1206 can be any known display technology, including but not limited to display devices using Liquid Crystal Display (LCD) or Light Emitting Diode (LED) technology. Processor(s) 1202 can use any known processor technology, including but are not limited to graphics processors and multi-core processors. Input device 1204 can be any known input device technology, including but not limited to a keyboard (including a virtual keyboard), mouse, track ball, and touch-sensitive pad or display. Bus 1212 can be any known internal or external bus technology, including but not limited to ISA, EISA, PCI, PCI Express, NuBus, USB, Serial ATA, FireWire or Thunderbolt. Computer-readable medium 1210 can be any medium that participates in providing instructions to processor(s) 1202 for execution, including without limitation, non-volatile storage media (e.g., optical disks, magnetic disks, flash drives, solid state drives, NVRAM, etc.) or volatile media (e.g., DRAM, SDRAM, ROM, etc.).

Computer-readable medium 1210 can include various instructions 1214 for implementing an operating system (e.g., Mac OS X®, Windows®, Linux). The operating system can be multi-user, multiprocessing, multitasking, multithreading, real-time and the like. The operating system performs basic tasks, including but not limited to: recognizing input from input device 1204; sending output to display device 1206; keeping track of files and directories on computer-readable medium 1210; controlling peripheral devices (e.g., disk drives, printers, etc.) which can be controlled directly or through an I/O controller; and managing traffic on bus 1212. Network communications instructions 1216 can establish and maintain network connections (e.g., software for implementing communication protocols, such as TCP/IP, HTTP, Ethernet, etc.). A graphics processing system 1218 can include instructions that provide graphics and image processing capabilities.

Application(s) 1220 can be an application that uses or implements the processes described in reference to FIGS. 1-11. For example, application(s) 1220 can include a database application that can use the enhanced B+tree implementations described above to manage database records. The processes can also be implemented in operating system 1214. For example, operating system 1214 can include file system management processes that use the enhanced B+tree implementations described above to manage files and blocks of data.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; solid state drives; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; solid state drives; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method for identifying a closest common ancestor for two leaf nodes, the method comprising:
   storing a B+tree data structure having a plurality of interior nodes and a plurality of leaf nodes, where each interior node has a plurality of entries, where each entry has a corresponding key and links the interior node to a child node, where the plurality of entries are sorted based on the corresponding entry key, where each leaf node has one or more records;
   obtaining a search key for traversing the B+tree;
   identifying a first interior node based on the search key;
   identifying a first entry of the first interior node based on the search key;
   determining that the first entry has a previous adjacent entry and a next adjacent entry in the first interior node;
   based on the determination, identifying the first interior node as an estimated closest common ancestor of a leaf node corresponding to the search key.

2. The method of claim 1, further comprising:
   identifying a second interior node below the first interior node on the B+tree based on the search key;
   identifying a second entry of the second interior node based on the search key;
   determining that the second entry has a previous adjacent entry and a next adjacent entry in the second interior node;
   based on the determination, identifying the second interior node as the estimated closest common ancestor of the leaf node corresponding to the search key.

3. The method of claim 1, further comprising:
   traversing the B+tree to the leaf node;
   determining that the search key corresponds to a beginning record in the leaf node;
   starting with the estimated closest common ancestor, finding a lowest interior node along a path through the B+tree to the leaf node that has a matching entry corresponding to the search key and a previous entry having a corresponding key that is smaller than the search key; and
   identifying the lowest interior node as a closest common ancestor.

4. The method of claim 1, further comprising:
   traversing the B+tree to the leaf node;
   determining that the search key corresponds to a ending record in the leaf node;
   starting with the estimated closest common ancestor, finding a lowest interior node along a path through the B+tree to the leaf node that has a matching entry corresponding to the search key and a next entry having a corresponding key that is greater than the search key; and identifying the lowest interior node as a closest common ancestor.

5. A non-transitory computer-readable medium including one or more sequences of instructions for identifying a closest common ancestor for two leaf nodes which, when executed by one or more processors, causes:

storing a B+tree data structure having a plurality of interior nodes and a plurality of leaf nodes, where each interior node has a plurality of entries, where each entry has a corresponding key and links the interior node to a child node, where the plurality of entries are sorted based on the corresponding entry key, where each leaf node has one or more records;

obtaining a search key for traversing the B+tree;

identifying a first interior node based on the search key;

identifying a first entry of the first interior node based on the search key;

determining that the first entry has a previous adjacent entry and a next adjacent entry in the first interior node;

based on the determination, identifying the first interior node as an estimated closest common ancestor of a leaf node corresponding to the search key.

6. The non-transitory computer-readable medium of claim 3, wherein the instructions cause:

identifying a second interior node below the first interior node on the B+tree based on the search key;

identifying a second entry of the second interior node based on the search key;

determining that the second entry has a previous adjacent entry and a next adjacent entry in the second interior node;

based on the determination, identifying the second interior node as the estimated closest common ancestor of the leaf node corresponding to the search key.

7. The non-transitory computer-readable medium of claim 3, wherein the instructions cause:

traversing the B+tree to the leaf node;

determining that the search key corresponds to a beginning record in the leaf node;

starting with the estimated closest common ancestor, finding a lowest interior node along a path through the B+tree to the leaf node that has a matching entry corresponding to the search key and a previous entry having a corresponding key that is smaller than the search key; and identifying the lowest interior node as a closest common ancestor.

8. The non-transitory computer-readable medium of claim 5, wherein the instructions cause:

traversing the B+tree to the leaf node;

determining that the search key corresponds to a ending record in the leaf node;

starting with the estimated closest common ancestor, finding a lowest interior node along a path through the B+tree to the leaf node that has a matching entry corresponding to the search key and a next entry having a corresponding key that is greater than the search key; and identifying the lowest interior node as a closest common ancestor.

9. A system comprising:

one or more processors; and a computer-readable medium including one or more sequences of instructions for identifying a closest common ancestor for two leaf nodes which, when executed by one or more processors, causes:

storing a B+tree data structure having a plurality of interior nodes and a plurality of leaf nodes, where each interior node has a plurality of entries, where each entry has a corresponding key and links the interior node to a child node, where the plurality of entries are sorted based on the corresponding entry key, where each leaf node has one or more records;

obtaining a search key for traversing the B+tree;

identifying a first interior node based on the search key;

identifying a first entry of the first interior node based on the search key;

determining that the first entry has a previous adjacent entry and a next adjacent entry in the first interior node;

based on the determination, identifying the first interior node as an estimated closest common ancestor of a leaf node corresponding to the search key.

10. The system of claim 9, wherein the instructions cause:

identifying a second interior node below the first interior node on the B+tree based on the search key;

identifying a second entry of the second interior node based on the search key;

determining that the second entry has a previous adjacent entry and a next adjacent entry in the second interior node;

based on the determination, identifying the second interior node as the estimated closest common ancestor of the leaf node corresponding to the search key.

11. The system of claim 9, wherein the instructions cause:

traversing the B+tree to the leaf node;

determining that the search key corresponds to a beginning record in the leaf node;

starting with the estimated closest common ancestor, finding a lowest interior node along a path through the B+tree to the leaf node that has a matching entry corresponding to the search key and a previous entry having a corresponding key that is smaller than the search key; and identifying the lowest interior node as a closest common ancestor.

12. The system of claim 9, wherein the instructions cause:

traversing the B+tree to the leaf node;

determining that the search key corresponds to a ending record in the leaf node;

starting with the estimated closest common ancestor, finding a lowest interior node along a path through the B+tree to the leaf node that has a matching entry corresponding to the search key and a next entry having a corresponding key that is greater than the search key; and identifying the lowest interior node as a closest common ancestor.

* * * * *

UNITED STATES PATENT AND TRADEMARK OFFICE
CERTIFICATE OF CORRECTION

PATENT NO. : 9,053,140 B2  
APPLICATION NO. : 13/630206  
DATED : June 9, 2015  
INVENTOR(S) : Wenguang Wang and David A. Majnemer Page 1 of 1

It is certified that error appears in the above-identified patent and that said Letters Patent is hereby corrected as shown below:

In the claims

Column 15, Line 26-27 (Claim 6), delete "claim 3," and insert -- claim 5, --, therefor.

Column 15, Line 38-39 (Claim 7), delete "claim 3," and insert -- claim 5, --, therefor.

Signed and Sealed this  
Twenty-seventh Day of October, 2015

Michelle K. Lee  
*Director of the United States Patent and Trademark Office*